United States Patent
Wang et al.

(10) Patent No.: US 12,541,561 B2
(45) Date of Patent: Feb. 3, 2026

(54) META-SEARCHING METHOD AND APPARATUS

(71) Applicant: SAMSUNG ELECTRONICS CO., LTD., Suwon-si (KR)

(72) Inventors: Chengjun Wang, Nanjing (CN); Bo Peng, Nanjing (CN); Jie Chen, Nanjing (CN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/217,831

(22) Filed: Jul. 3, 2023

(65) Prior Publication Data

US 2024/0119096 A1    Apr. 11, 2024

Related U.S. Application Data

(63) Continuation of application No. PCT/KR2023/008316, filed on Jun. 15, 2023.

(30) Foreign Application Priority Data

Oct. 8, 2022    (CN) .................. 202211230678.X

(51) Int. Cl.
| | | |
|---|---|---|
| *G06F 16/953* | (2019.01) | |
| *G06F 16/951* | (2019.01) | |
| *G06F 21/31* | (2013.01) | |

(52) U.S. Cl.
CPC .......... *G06F 16/953* (2019.01); *G06F 16/951* (2019.01); *G06F 21/31* (2013.01)

(58) Field of Classification Search
CPC ....... G06F 16/953; G06F 16/951; G06F 21/31
See application file for complete search history.

(56) References Cited

U.S. PATENT DOCUMENTS

| | | | | |
|---|---|---|---|---|
| 6,285,999 B1* | 9/2001 | Page | ...................... | G06F 16/951 |
| | | | | 707/999.005 |
| 7,930,286 B2* | 4/2011 | Sue | ........................ | G06F 16/338 |
| | | | | 707/723 |

(Continued)

FOREIGN PATENT DOCUMENTS

| | | |
|---|---|---|
| CN | 103646093 A | 3/2014 |
| CN | 102902800 B | 6/2015 |

(Continued)

OTHER PUBLICATIONS

International Search Report and Written Opinion issued by the International Searching Authority on Sep. 18, 2023 in International Patent Application No. PCT/KR2023/008316 (PCT/ISA/220, PCT/ISA/210, and PCT/ISA/237).

(Continued)

*Primary Examiner* — Mark E Hershley
(74) *Attorney, Agent, or Firm* — Sughrue Mion, PLLC

(57) ABSTRACT

A meta-searching method, including determining a target metaverse for a current search using intent classification based on an inquiry text included in a searching request of a user; extracting a searching clue and a clue type; selecting a current search engine for performing the current search using the target metaverse and the clue type by prioritizing a search engine associated with the target metaverse; performing identity authentication using the user account information of the user in the target metaverse prior to the search based on determining that user account information is required to search for the searching clue for performing a search using the current search engine, and performing the search using the current search engine based on the searching clue; and providing the search results to the user.

20 Claims, 10 Drawing Sheets

(56) References Cited

U.S. PATENT DOCUMENTS

| | | | | |
|---|---|---|---|---|
| 8,239,451 | B1* | 8/2012 | Lunenfeld | G06Q 30/0623 |
| | | | | 709/203 |
| 9,396,260 | B2* | 7/2016 | Castelli | G06F 16/95 |
| 10,061,819 | B2* | 8/2018 | Cohen | G06F 16/248 |
| 10,482,082 | B2* | 11/2019 | Seo | G06F 16/285 |
| 2009/0147003 | A1* | 6/2009 | Do | G06T 15/205 |
| | | | | 345/427 |
| 2010/0005424 | A1* | 1/2010 | Sundaresan | G06F 3/04815 |
| | | | | 715/849 |
| 2010/0174719 | A1* | 7/2010 | Vilches | G06F 16/9535 |
| | | | | 707/741 |
| 2011/0014985 | A1* | 1/2011 | Park | A63F 13/60 |
| | | | | 463/43 |
| 2011/0231433 | A1* | 9/2011 | Tabata | G06N 3/006 |
| | | | | 707/769 |
| 2011/0231434 | A1* | 9/2011 | Tabata | G06N 3/006 |
| | | | | 707/769 |
| 2016/0132553 | A1 | 5/2016 | Seo et al. | |
| 2016/0299972 | A1* | 10/2016 | Samdani | G06F 16/951 |
| 2017/0132294 | A1* | 5/2017 | Cooper | G06F 16/248 |
| 2017/0155631 | A1 | 6/2017 | Du | |
| 2017/0177713 | A1* | 6/2017 | Smyros | G06F 16/334 |
| 2020/0410391 | A1* | 12/2020 | Barrett | G06N 5/04 |
| 2021/0263928 | A1* | 8/2021 | Nair | G06F 16/24522 |
| 2022/0107802 | A1 | 4/2022 | Rao et al. | |
| 2022/0132214 | A1* | 4/2022 | Felman | H04N 21/278 |
| 2022/0343768 | A1* | 10/2022 | Di Cosola | G08G 5/55 |
| 2023/0071994 | A1* | 3/2023 | Day | G16H 50/20 |
| 2023/0135179 | A1* | 5/2023 | Mielke | G06N 5/022 |
| | | | | 704/232 |
| 2023/0205781 | A1* | 6/2023 | Bharadwaj | G06F 16/3331 |
| | | | | 707/603 |
| 2023/0259981 | A1* | 8/2023 | Venezia | G06Q 30/0207 |
| | | | | 705/14.67 |
| 2023/0274314 | A1* | 8/2023 | Boudville | H04N 13/204 |
| | | | | 705/14.51 |
| 2023/0281940 | A1* | 9/2023 | Shen | G06V 20/20 |
| | | | | 345/419 |
| 2023/0325896 | A1* | 10/2023 | Luker | G06Q 30/0643 |
| | | | | 705/26.1 |
| 2023/0360006 | A1* | 11/2023 | Patel | G06Q 30/0643 |
| 2023/0418885 | A1* | 12/2023 | Rush | G06F 16/41 |
| 2024/0020936 | A1* | 1/2024 | Chokshi | G06Q 20/123 |
| 2024/0028652 | A1* | 1/2024 | Boudville | G06T 13/40 |
| 2024/0078297 | A1* | 3/2024 | Bhatia | G06F 3/011 |
| 2024/0112409 | A1* | 4/2024 | Cross | G06F 3/011 |
| 2024/0118784 | A1* | 4/2024 | Wang | G06F 3/0484 |
| 2024/0119096 | A1* | 4/2024 | Wang | G06F 21/31 |
| 2025/0094417 | A1* | 3/2025 | Nair | G06F 16/2282 |

FOREIGN PATENT DOCUMENTS

| | | |
|---|---|---|
| CN | 106528600 A | 3/2017 |
| CN | 113779364 A | 12/2021 |
| CN | 114707043 A | 7/2022 |
| CN | 114969696 A | 8/2022 |
| CN | 115587197 A | 1/2023 |
| KR | 10-2012-0140378 A | 12/2012 |

OTHER PUBLICATIONS

Ludo, https://ludo.com/Ludo_LitePaper.pdf, retrieved from internet on Jun. 21, 2023. (1 page).

"Metaverse", Wikipedia, https://en.wikipedia.org/wiki/Metaverse, retrieved on Jun. 21, 2023. (11 pages total).

"Microsoft metaverse vs. Facebook metaverse: What's the difference?", Cointelegraph, https://cointelegraph.com/metaverse-forbeginners/microsoft-metaverse-vs-facebook-metaverse-what-is-the-difference, retrieved on Jun. 21, 2023. (5 pages total).

Park, Sang-Min et al., "A Metaverse: Taxonomy, Components, Applications, and Open Challenges", IEEE Access, Jan. 13, 2022, vol. 10, pp. 4209-4251.

Quinn, Callan, "Lighthouse Labs raises $7 million in seed round to build metaverse search engine" Venture Capital, May 11, 2022, https://www.theblockcrypto.com/linked/146303/lighthouse-labs-raises-7-million-in-seed-round-to-build-metaverse-search-engine. (4 pages total).

"Metasearch engine", Wikipedia, https://en.wikipedia.org/wiki/Metasearch_engine, retrieved on Jun. 21, 2023. (6 pages total).

Balfanz, Dirk et al., "Web Authentication: An API for accessing Public Key Cresentials" Level 1, W3C Recommendation, Mar. 4, 2019, https://www.w3.org/TR/2019/REC-webauthn-1-20190304/. (76 pages total).

DH Web Desk, "Apple, Google, Microsoft commit to bring FIDO standard passwordless sign-in on devices in 2023", Deccan Herald News, May 5, 2022, https://www.deccanherald.com/business/apple-google-microsoftcommit-to-bring-fido-standard-passwordless-sign-in-on-devices-in-2023-1106753.html. (11 pages total).

"Mobile deep linking", Wikipedia, https://en.wikipedia.org/wiki/Mobile_deep_linking, retrieved on Jun. 22, 2023. (3 pages total).

Palmer, Robert, "With Apps and the Internet, You Can't Access What You Can't Find", PharmaLive.com, Dec. 5, 2016, https://www.pharmalive.com/withapps-and-the-internet-you-cant-access-what-you-cant-find-2. (4 pages total).

"Samsung assistant, Bixby, will Sam replace him soon? hard to believe", Persia Digest, https://persiadigest.com/samsung-assistant-bixby-will-sam-replace-him-soon-hard-tobelieve/, retrieved on Jun. 22, 2023. (3 pages total).

Date, Saroj S., "A Comprehensive Review on Intents, Intention Mining and Intention Classification", International Journal of Science and Research (IJSR), vol. 9, Issue 11, Nov. 2020, https://www.researchgate.net/profile/Shttps://www.ijsr.net/archive/v9i11/SR201015182533. (5 pages total).

Communication dated Jul. 30, 2025, issued by the European Patent Office in counterpart European Application No. 23874998.0.

* cited by examiner

META-SEARCHING METHOD AND APPARATUS

CROSS-REFERENCE TO RELATED APPLICATIONS

This application is a continuation of International Application No. PCT/KR2023/008316, filed on Jun. 15, 2023, in the Korean Intellectual Property Receiving Office, which is based on and claims priority to Chinese Patent Application No. 202211230678.X, filed on Oct. 8, 2022, in the China National Intellectual Property Administration, the disclosures of which are incorporated by reference herein in their entireties.

BACKGROUND

1. Field

The disclosure relates to meta-searching, and particularly, to a meta-searching method and electronic device.

2. Description of Related Art

A metaverse may refer to a virtual world created and linked-up using scientific and technological means. A metaverse may be mapped from, and interactive with, the real world, and may include a digital living space with a novel social system. The application of the metaverse may be restricted by several factors including hardware devices, sensors, artificial intelligence (AI), etc. Organizing and retrieving metaverse data is also a research hotspot. From the perspective of data, compared with flat Web data, metaverse data may have more dimensions and more complex inter-data relationships. For example, a metaverse may include many inter-related universes and platforms. Each platform may include static data and dynamic data, such as people, buildings, assets, pictures, audio and video etc., and users may be associated with the data assets. In the future, the amount of such multi-dimensional and multi-modal data may be far larger than the amount of current Web data. Just like a satellite group in the real world, "satellites" are also needed in the metaverse world, otherwise, the metaverse world may only be a set of small villages, and the world of each person may be limited to reachable places or within a limited cognitive range. With metaverse searching as a data center, the metaverse world may become an interconnected and boundless city cluster.

At present, searching schemes for metaverse mainly include general search engines, vertical search engines and meta-search engines.

The general search engine may be a search engine website dedicated to providing searching services, such as Google, Baidu, etc. Servers of such websites gather information of various web pages on the Internet into the servers, and process the information to establish an information database and an index database, to provide user-required information or related pointers in response to various searching operations performed by users. Searching manners of the user mainly include free word full-text search, keyword search, classification search, and search of other specific information.

A vertical search engine is a search engine serving particular fields, such as ElasticSearch. A vertical search engine may establish indices for all application (APP) metadata. When a user input text for search, a similarity between the input text and each domain is calculated to obtain a score, search results are sorted by a sorting model algorithm with similarities in domains such as title/classification/description/etc. and scores in domains such as the number of APP downloads/update time, etc. being collectively considered, and the sorted results are then returned to the user.

A meta-search engine may involve the integration, invocation, manipulation, and optimized utilization of multiple independent search engines. As opposed to meta-search engines, an available individual search engine is referred to as "source search engines" or "searching resources". The technique that integrates, invokes, manipulates, and makes optimal utilization of source search engines is referred to as "meta-searching technique", which is the core of meta-search engines. A typical meta-search engine, such as Skyscanner, gathers search results from other online travel service providers.

During the process of implementing the present disclosure, inventors found that related-art meta-search schemes have insufficient searching efficiency due to reasons including: none of related-art general search engines and vertical search engines can perform cross-metaverse searching, index and search deep contents of many metaverse APPs. Also, in metaverse APPs, there are a lot of private contents associated with user accounts, which may form a large proportion of searching target contents of users, whereas related-art search engines do not support searching of private contents of users. Therefore, since related-art meta-search schemes are limited in searching breadth and depth and cannot provide user with effective search results, cannot meet searching requirements of lots of users.

SUMMARY

Provided is a meta-searching method and apparatus to improve the effectiveness of meta-searching.

Additional aspects will be set forth in part in the description which follows and, in part, will be apparent from the description, or may be learned by practice of the presented embodiments.

In an embodiment, a meta-searching method is provided. The method may include determining a target metaverse for a current search using intent classification based on an inquiry text included in a searching request of a user. The method may include extracting a searching clue and a clue type of the searching clue. The method may include selecting a current search engine for performing the current search using the target metaverse and the clue type by prioritizing a search engine associated with the target metaverse. The method may include determining whether performing identity authentication using the user account information of the user in the target metaverse prior to the search based on whether it is determined that user account information is required to search for the searching clue for performing a search using the current search engine. The method may include performing the search using the current search engine based on the searching clue. The method may include providing search results to the user.

In an embodiment, an electronic device for meta-searching, may include a memory (110) configured to store instructions and at least one processor configured to execute the instructions. The at least one processor configured to execute the instructions to determine a target metaverse for a current search using intent classification based on an inquiry text included in a searching request of a user. The at least one processor configured to execute the instructions to extract a searching clue and a clue type of the searching clue. The at least one processor configured to execute the instructions to select a current search engine for performing the current search using the target metaverse and the clue type by prioritizing a search engine associated with the target metaverse. The at least one processor configured to execute the instructions to perform identity authentication using the user account information of the user in the target metaverse prior to the search based on selecting the search engine associated with the target metaverse as the current search engine, and based on it is determined that user account information is required to search for the searching clue. The at least one processor configured to execute the instructions to perform the search using the current search engine based on the searching clue. The at least one processor configured to execute the instructions to provide the search results to the user.

In an embodiment, a non-transitory computer-readable storage medium, storing instructions for executing the method is provided. The method may include determining a target metaverse for a current search using intent classification based on an inquiry text included in a searching request of a user. The method may include extracting a searching clue and a clue type of the searching clue. The method may include selecting a current search engine for performing the current search using the target metaverse and the clue type by prioritizing a search engine associated with the target metaverse. The method may include determining whether performing identity authentication using the user account information of the user in the target metaverse prior to the search based on whether it is determined that user account information is required to search for the searching clue for performing a search using the current search engine. The method may include performing the search using the current search engine based on the searching clue. The method may include providing search results to the user.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Embodiments are described in detail with reference to the accompanying drawings.

Figure 1:
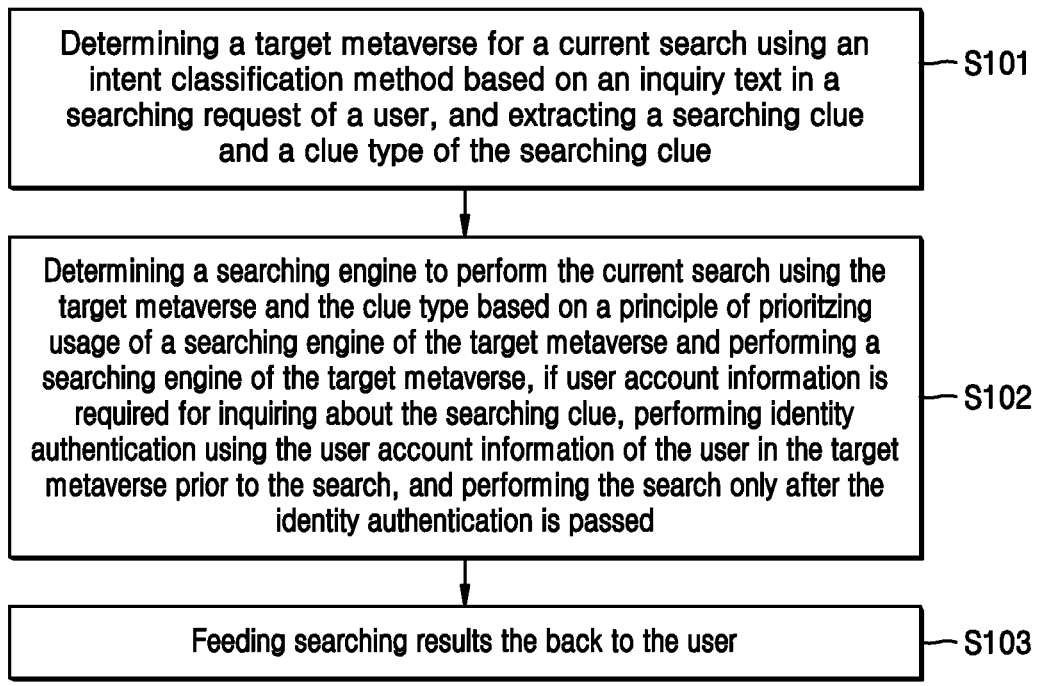
FIG. 1 is a flowchart illustrating a method according to an embodiment.

FIG. 1 is a flowchart illustrating a meta-searching process according to an embodiment. As shown in FIG. 1, the embodiment may include the following:

At step S101, the process 100 may include determining a target metaverse for a current search using an intent classification method based on an inquiry text in a searching request of a user, and extract a searching clue and a clue type of the searching clue.

In this step, after a searching request of a user for metaverse information is received, inquiry text in the searching request is analyzed using intent classification, to determine a metaverse (i.e. a target metaverse) to which contents which are searched by the user may belong, and a searching clue and a corresponding clue type are extracted from the inquiry text for use in selecting an appropriate search engine for the search in subsequent procedures. As such, cross-metaverse searching and searching for deep contents of many metaverse applications (APPs) can be realized.

In embodiments, an intent identification model may be trained using any desired methods, and subsequently used for implementing this step.

At step S102, the process 100 may include determining a search engine for performing the current search using the target metaverse and the clue type based on prioritizing the usage of the search engine of the target metaverse, and performing a search using the search engine based on the searching clue. When the search engine of the target metaverse is determined to be used, if user account information is required for the search using the searching clue, an identity authentication is performed based on user account information of the user in the target metaverse before the search, and the search is performed only after the identity authentication is passed or achieved.

This step may be used to determine a search engine to be used in the current search according to the principle of prioritizing the usage of the search engine of the target metaverse. When the search engine of the target metaverse is used, if the inquiry about the searching clue relates to private contents associated with a user account, the identity of the user account may be authenticated first. When the identity authentication is passed, the search engine of the target metaverse is used to perform the search. When the identity authentication is not passed, the search is abandoned; further, alert information may also be provided to the user indicating that the search cannot be performed because the identity authentication is not passed. With this step, when a search involves deep contents of the target metaverse, the deep contents can be searched using the search engine of the target metaverse only when the identity authentication is passed. In this way, cross-metaverse searching can be realized, and the security of private information of users can be effectively guaranteed or otherwise safeguarded while the deep contents of many metaverse applications can be searched.

In an embodiment, the search engine to be used for the current search may be determined according to the following: if the target metaverse has a search engine which supports the clue type, search engine of the target metaverse is determined to serve as the search engine for the current search; otherwise, a preset or predetermined general search engine is determined to serve as the search engine for the current search.

Taking into consideration that private contents associated with a user account may be inaccessible by a general search engine, alert information may be provided to the user that the target metaverse does not currently support the current deep search when inquiring about the searching clue requires user account information and a general search engine is determined to perform the search, to further improve the searching experience of the user.

According to embodiments, it may first be determined whether the current searching request may be executed by the search engine of the target metaverse, for example whether the target metaverse includes an independent search engine which supports the clue type. If so, the search engine of the target metaverse supports the current searching request, and thus the independent metaverse search engine (i.e. the search engine of the target metaverse) is determined to serve as the search engine for the current searching request. When the search engine of the target metaverse does not support the current searching request, embodiments may use a general search engine for the current meta-searching, to satisfy the meta-searching request of the user as much as possible.

In practice, pre-stored metadata of different metaverse search engines may be used for determining whether the target metaverse includes an independent search engine that supports the clue type obtained in step S101.

In embodiments, the metadata of the metaverse search engine may include configuration information related with the metaverse search engine, and may include: configuration information specifying searching is performed by a local metaverse application program or a server, uniform resource indicator (URI), supported clue types, identity authentication information, etc. An example of such configuration information is illustrated in Table 1 below.

In embodiments, the search engine of the target metaverse may be an independent third-party metaverse search engine, which may be deployed in a device-side metaverse application which provides a searching interface (e.g. intent "android.intent.action.SEARCH" is supported in an Android system), and may also be deployed in a remote metaverse searching server. The independent third-party metaverse search engine may be implemented using related-art methods, such as a related-art centralized indexing/searching method, or a decentralized searching method based on blockchain and non-fungible token (NFT).

In an embodiment, the identity authentication in step S102 may be implemented using a method of client authentication or metaverse authentication. That is, the identity authentication may be implemented using user account information of the user in the target metaverse by performing identity authentication of the user using a client and/or server of the target metaverse based on user account information of the user in the target metaverse.

In practical applications, in order to enable multi-person sharing of a terminal according to an embodiment, the identity authentication may be performed based on a biological feature authenticator (e.g., a biological feature such as a voiceprint or a face) deployed in the same device as the client.

TABLE 1

| Metaverse name | Metaverse type | app-based search | URI | Supported type of slots and whether to search based on login | Authenticator information | Access manner |
|---|---|---|---|---|---|---|
| A | Game | No | https://abc . . . | Game tips: No<br>Inventory items: No<br>Map: No<br>Social: Yes<br>User account info: Yes<br>Other search with query text: Yes | Multi-factor: password/ voiceprint | Function Common_search_A (URI, query_text) |
| B | Virtual Meeting | Yes | https://xyz . . . | . . . | Single-factor: password | Function Search_A (URI, query_text) |
| C | Shopping | Yes | https://shop . . . . . . | | . . . | . . . |

The above metadata may be obtained using crawlers which obtain Open documents/Application Programming Interfaces (APIs)/self-describing files about functions supported by different meta-search engines, or may be defined by developers in cooperation with metaverse providers.

In an embodiment, the corresponding search may be specifically performed by the search engine determined in step S102 using the following: if the search engine used for the current search is the search engine of the target metaverse, the search is performed by the search engine of the target metaverse based on the searching clue, but if the search engine used for the current search is a preset general search engine, the search is performed by the search engine based on the target metaverse and the searching clue.

According to embodiments, when the search engine of the target metaverse is used, a searching request is generated with the searching clue extracted in step S101 as a parameter, and is transmitted to the search engine of the target metaverse, to trigger the search engine to perform a corresponding search and return search results. When a general search engine is used, a searching request is generated with the searching clue extracted in step S101 and the target metaverse as parameters, and is transmitted to the general search engine, to trigger the general search engine to perform a corresponding search and return search results. In embodiments, the general search engine may perform a corresponding search according to its searching configurations.

Figure 2:
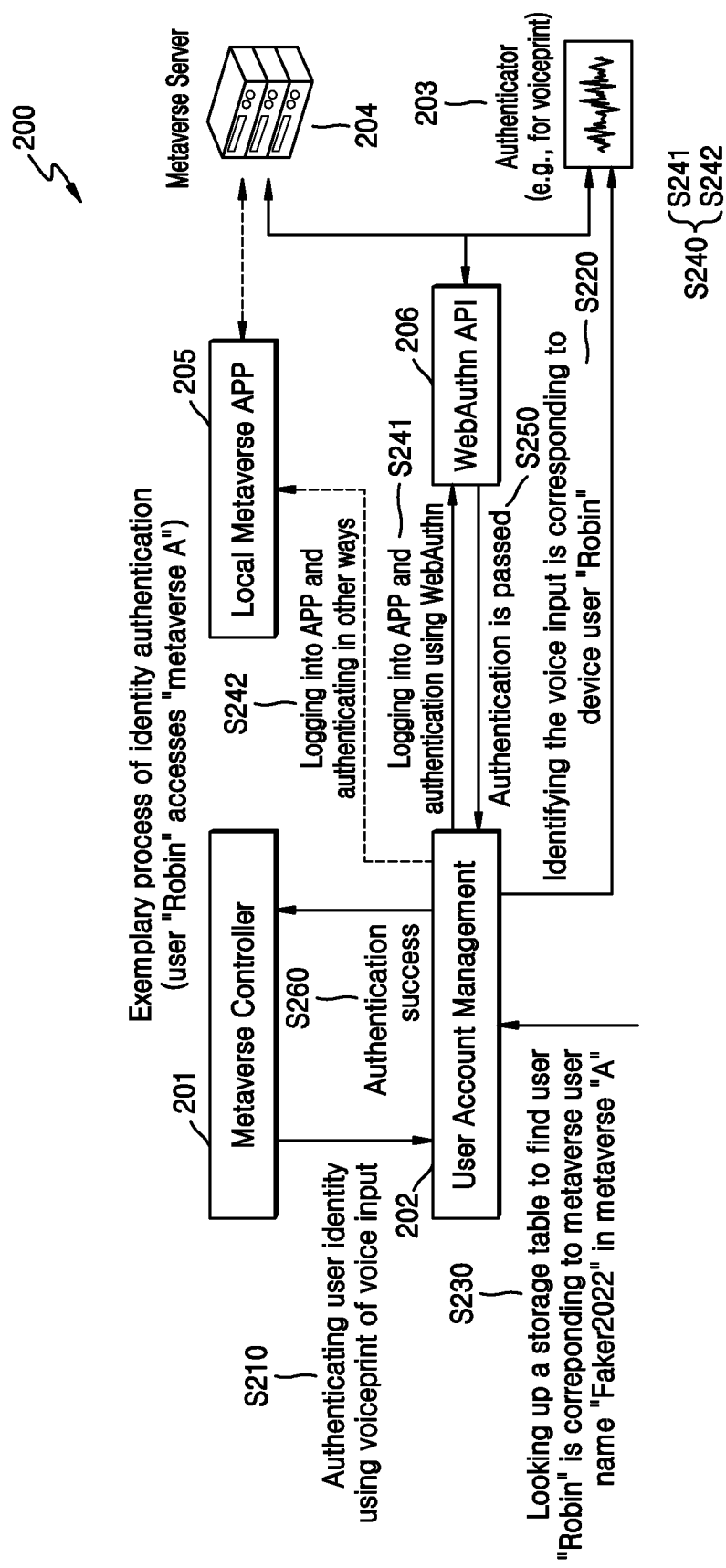
FIG. 2 is a flowchart illustrating an identity authentication process according to an embodiment.

As shown in FIG. 2, taking the identity authentication performed when user "Robin" accesses "metaverse A" as an example, the identity authentication of the user may be implemented using a process 200.

At operations S210 and S220, the process 200 may include identifying the user by voice information or a face image of the user by at least one of a metaverse controller 201 and a user account management module 202 using a corresponding biological feature authenticator 203 to obtain a user device name of the user.

The voice information of the user may be a voice instruction of the user for inputting a searching request, or may be voice information which triggers user input prior to the search. By using the former, the identity authentication process can be transparent to the user, and therefore may not require user participation, which can improve the searching convenience.

At step S230, the process 200 may include looking up a metaverse user account configuration table preset in a local device, and determining a metaverse user name and an authentication manner of an account corresponding to the user device name in the target metaverse, for example by using user account management module 202.

In practical applications, the metaverse user account configuration table may be implemented in the form of Table 2 below:

TABLE 2

| Metaverse name | Device user name | Metaverse user name | Metarverse App-based search | Authenticator type | First factor type | First factor content | Second factor type | Second factor content |
|---|---|---|---|---|---|---|---|---|
| A | Jimmy | Hero007 | No | Multi-factor authentication | Password | Bdgssacsdghs . . . | Voiceprint | System |
| A | Robin | Faker2022 | No | Multi-factor authentication | Password | Abdfafasfaslt . . . | Voiceprint | System |
| B | Jimmy | Akaka | Yes | Single-factor authentication | Voiceprint | System | None | None |

In Table 2, the authentication manner adopted by the client, such as password, voiceprint, etc., may be known from the combination of the authenticator type, the factor type and the factor content.

At step S240, the process 200 may include performing identity authentication of the user based on the user account information stored in a local device using the client, for example a local metaverse APP 205 and/or a server 204 for the target metaverse according to the authentication manner.

It should be noted that in practical applications, different metaverses may have different requirements for identity authentication. For example, server-side authentication may adopt WebAuthn or similar techniques, for example through a WebAuthn API 206. In order to meet the security requirements of metaverse applications, it may be determined whether to use the client-side authentication or the server-side authentication or a combination thereof for identity authentication according to the actual account management requirements of the metaverse applications. For example, step S240 may include one or more of step S241, which includes logging into the local metaverse APP 205 and authenticating using the WebAuthn API 206, and step S242, which includes logging into the local metaverse APP 205 and authenticating in other ways.

At step S250, the process 200 may include determining that the authentication is passed or achieved successfully, and at step S260, the process 200 may include notifying the metaverse controller 201 of the authentication success.

At step S103, the process 100 may include providing or feeding the search results back to the user.

This step may be used to feed back the search results of step S102 to the user. In an embodiment, in order to improve the searching experiences of the user, the search results may be sorted with searching preferences of the user taken into consideration prior to the feedback of the search results, to enable the user to view search results more closely related with the searching requirements. Accordingly, the search results may be fed back to the user by sorting the search results fed back by the search engine according to a user profile of the user, and feeding the sorted results back to the user, the user profile includes searching preference information of the user, to prioritize display of search results that best match searching habits of the user.

As can be seen from the above description, embodiments may integrate and invoke a metaverse-specific search engine and a general search engine, and can realize in-depth searching of metaverse contents, thereby overcoming drawbacks of related-art general search engines, for example an inability to search user-related contents and dynamic contents in a metaverse, and also overcoming drawbacks of the metaverse-specific search engine, for example being restricted to be used individually within a metaverse. Moreover, the embodiments may simultaneously support many different metaverse search engines, not only providing a single searching request input interface for use by users, but also further integrating or re-sorting search results according to a user profile, searching preferences, etc. In addition, in practical applications, embodiments may also be combined with other functions of metaverse applications to invoke the other functions of the metaverse applications after the search is completed. Therefore, embodiments may realize cross-metaverse searching to enable the user to search information of all metaverses anytime and anywhere, and to find the deep contents of many metaverse applications, thereby effectively expanding the depth and width of meta-searching and improving the accuracy and effectiveness of the meta-searching. In this way, intra-application in-depth searching and interactive capabilities of APPs such as voice assistants, application stores and game centers can be improved, thereby effectively improving user experiences.

Embodiments may be implemented as a searching assistant APP which may be called by any metaverse application or may be started by an operating system alone. Examples of implementations are described in further detail below with reference to and FIGS. 3-5.

Example 1: Inquiring about personal information (such as the status of a person) related with a user account.

Figure 3:
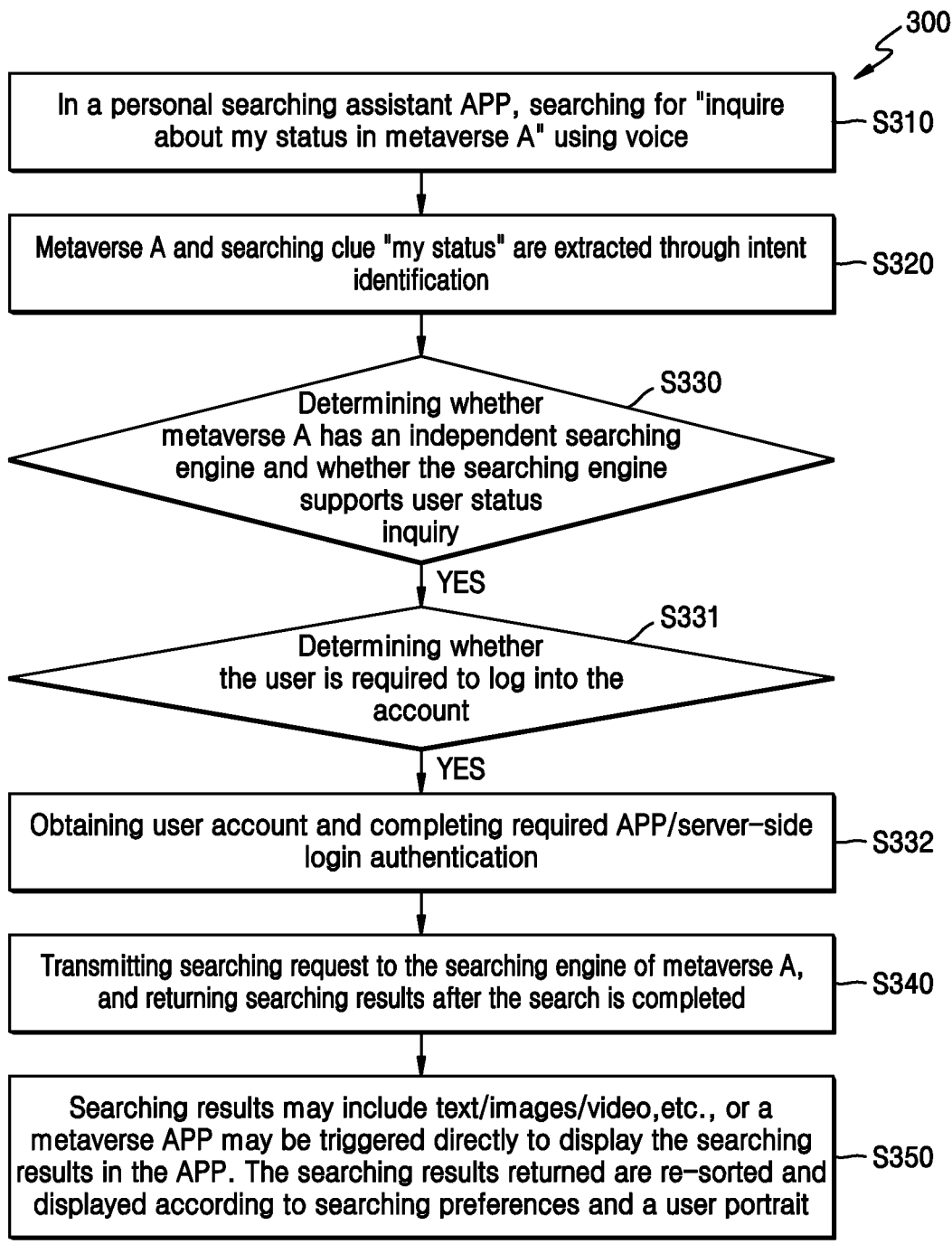
FIGS. 3-5 are schematic diagrams illustrating exemplary applications of an embodiment.

According to Example 1, an inquiry text may include "inquire about my status in metaverse A". As shown in FIG. 3, the search is completed based on the inquiry text using a process 300.

At step S310, the process 300 may include initiating a voice search in a personal searching assistant APP to search for "inquire about my status in metaverse A".

At step S320, the process 300 may include extracting metaverse A and a searching clue "my status" through intent identification.

At step S330, the process 300 may include determining whether metaverse A has an independent search engine and whether inquiry about the user status is supported by the search engine. If it is determined that metaverse A has an independent search engine and inquiry about the user status is supported by the search engine, step S331 is performed.

In Example 1, there may be a search engine of metaverse A which supports user status query, thus step S331 is performed after this step.

At step S331, the process 300 may include determining whether the user is required to log into the account. If the user is required to log into the account, step S332 is performed; otherwise, step S340 is performed.

Here, it can be determined from the searching clue "my status" that the account information of the user in metaverse A is to be authenticated for the current inquiry, and thus step S332 is to be performed after this step.

At step S332, the process 300 may include obtaining the user account and completing the required APP/server-side login authentication.

In Example 1, the login authentication of this step is passed, thus step S340 is to be performed after this step to inquire about "my status" in metaverse A using the search engine of metaverse A.

At step S340, the process 300 may include transmitting a searching request to the search engine of metaverse A, and search results are returned after the search is completed.

At step S350, the process 300 may include The search results may include text/images/video, etc., or a metaverse APP may be triggered directly to display the search results in the APP. The search results returned may be re-sorted and displayed according to searching preferences and a user profile of the user.

Example 2: Inquiring about metaverse information not associated with the user (e.g., game strategies or metaverse guides, etc.).

Figure 4:
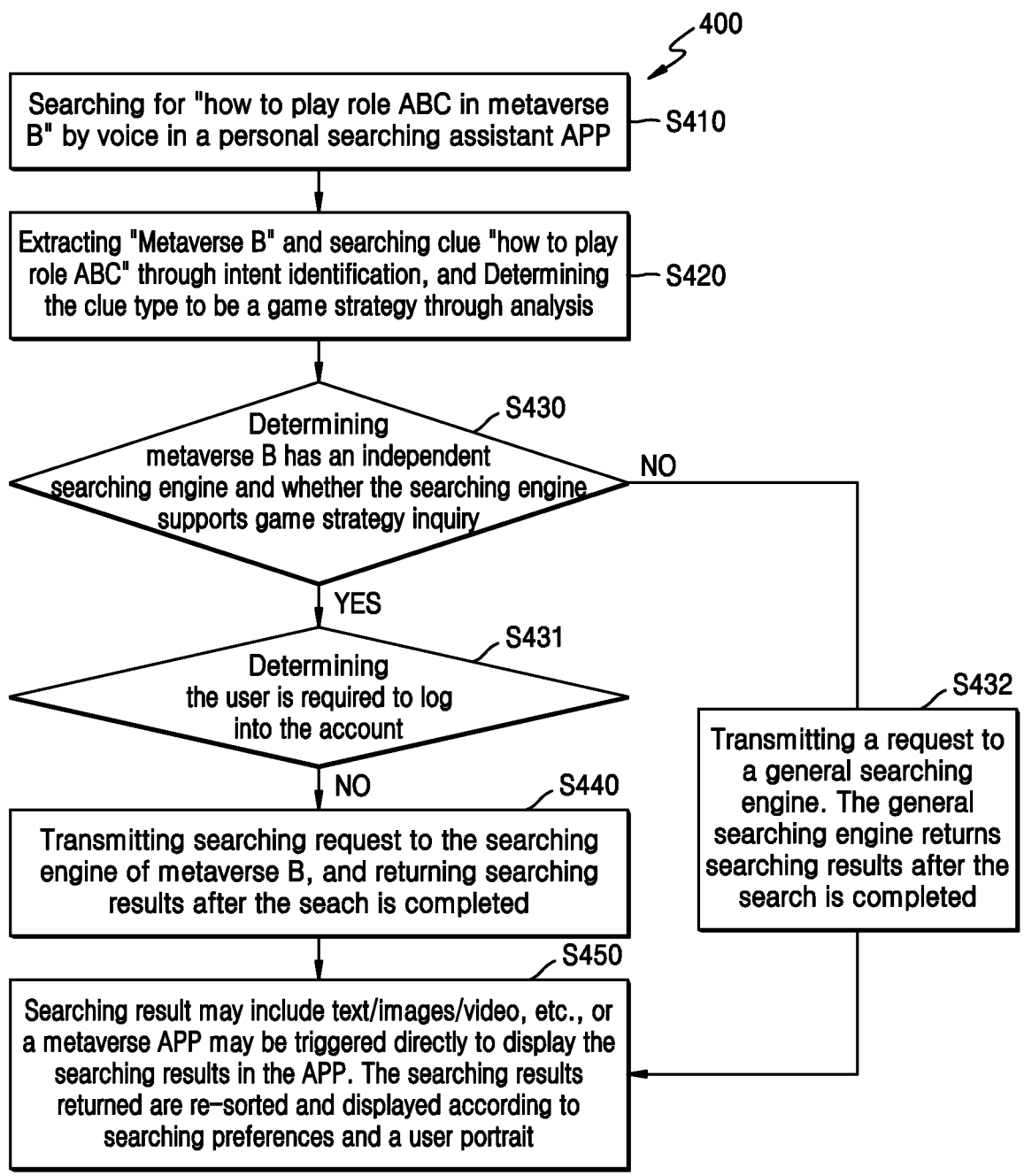

In Example 2, an inquiry text may include "how to play the role ABC in metaverse B". As shown in FIG. 4, the search is completed based on the inquiry text using a process 400.

At step S410, the process 400 may include initiating a voice search in a personal searching assistant APP to search for "how to play role ABC in metaverse B".

At step S420, the process 400 may include extracting "metaverse B" and a searching clue "how to play role ABC" through intent identification, and a clue type is determined to be a game strategy through analysis.

At step S430, the process 400 may include determining whether there is an independent search engine corresponding to metaverse B and whether game strategy inquiry is supported by the search engine, if there is an independent search engine corresponding to metaverse B and game strategy inquiry is supported by the search engine, step S431 is performed; otherwise, step S432 is performed.

In Example 2, processing examples for two assumptions are provided. According to one of the assumptions, the conditions are met, i.e., the search engine of metaverse B exists and supports game strategy query, and then step S431 is performed. According to the other assumption, the above conditions are not met, and then step S432 is performed.

At step S431, the process 400 may include determining whether the user is required to log into the account, and if the user is not required to log into the account, step S440 is performed.

Here, it may be determined from the searching clue "how to play role ABC" that the user is not required to log into the account in metaverse B, and step S440 is performed to search using the search engine of metaverse B.

At step S432, the process 400 may include transmitting a request to a general search engine. Search results are returned after the search is completed by the general search engine, and step S450 is performed.

Here, since the search engine of metaverse B is not used for the search, a searching request is generated using "metaverse B" and "how to play role ABC", and is transmitted to the general search engine to perform the search.

At step S440, the process 400 may include transmitting a searching request the search engine of metaverse B, and search results are returned after the search is completed.

At step S450, according to the process 400, the search results may include text/images/video, etc., or a metaverse APP may be triggered directly to display the search results in the APP. The search results returned are re-sorted and displayed according to searching preferences and a user profile of the user.

Figure 5:
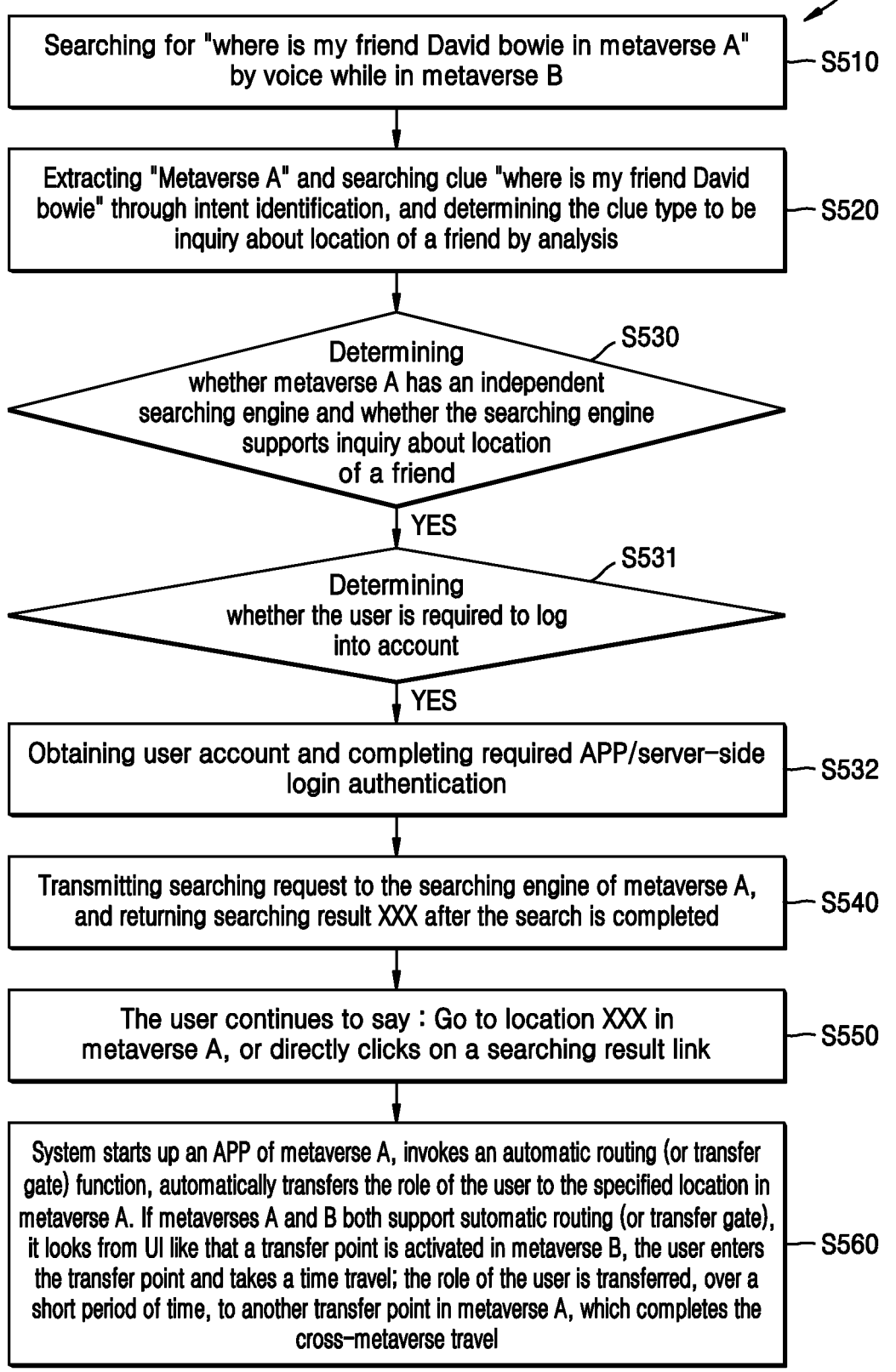

Example 3: Searching and other functions are associated in a metaverse. In Example 3, searching may be associated with a time travel function of a metaverse. A user first queries about information of another metaverse to obtain a location the user intends to go, and then invokes the time travel function of the metaverse to implement cross-metaverse time travel. In Example 3, an inquiry text in this example may include "where is my friend David bowie in metaverse A". The above association of searching and the time travel function of a metaverse may be implemented using a process 500 as shown in FIG. 5.

At step S510, the process 500 may include initiating a voice search to search for "where is my friend David bowie in metaverse A" while a user is in metaverse B.

At step S520, the process 500 may include extracting "metaverse A" and a searching clue "where is my friend David bowie" through intent identification, and a clue type is determined to be an inquiry about the location of a friend through analysis.

At step S530, the process 500 may include determining whether there is an independent search engine corresponding to metaverse A and whether a friend location inquiry is supported by the search engine, and if there is an independent search engine corresponding to metaverse A and a friend location inquiry is supported by the search engine, step S531 is performed.

In Example 3, the conditions may be met at that moment, for example the search engine of metaverse A exists and supports a friend location inquiry, and then step S531 is performed.

At step S531, the process 500 may include determining whether the user is required to log into the account.

Here, it may be determined from the searching clue "where is my friend David bowie" that the user is required to log into the account in metaverse A, and step S532 is performed to search using the search engine of metaverse A.

At step S532, the process 500 may include obtaining the user account and the required APP/server side login authentication is completed.

In Example 3, the login authentication of this step may be passed, thus step S540 is to be performed after this step to inquire about "my status" in metaverse A using the search engine for metaverse A.

At step S540, the process 500 may include transmitting searching request to the search engine of metaverse A, and a search result XXX is returned after the search is completed.

At step S550, according to the process 500, the user continues to speak: Go to location XXX in metaverse A, or directly clicks on a link of the search result.

At step S560, according to the process 500, the operating system starts up an APP of metaverse A, invokes an automatic routing (or transfer gate) function, and automatically transfers the role of the user to the specified location in metaverse A. If metaverses A and B both support automatic routing (or transfer gate), it may appear from the user interface (UI) as if a transfer point is activated in metaverse B, and the user may enter the transfer point and take a time travel. The role of the user is transferred, over a short period of time, to another transfer point in metaverse A, which completes the cross-metaverse travel.

Figure 6:
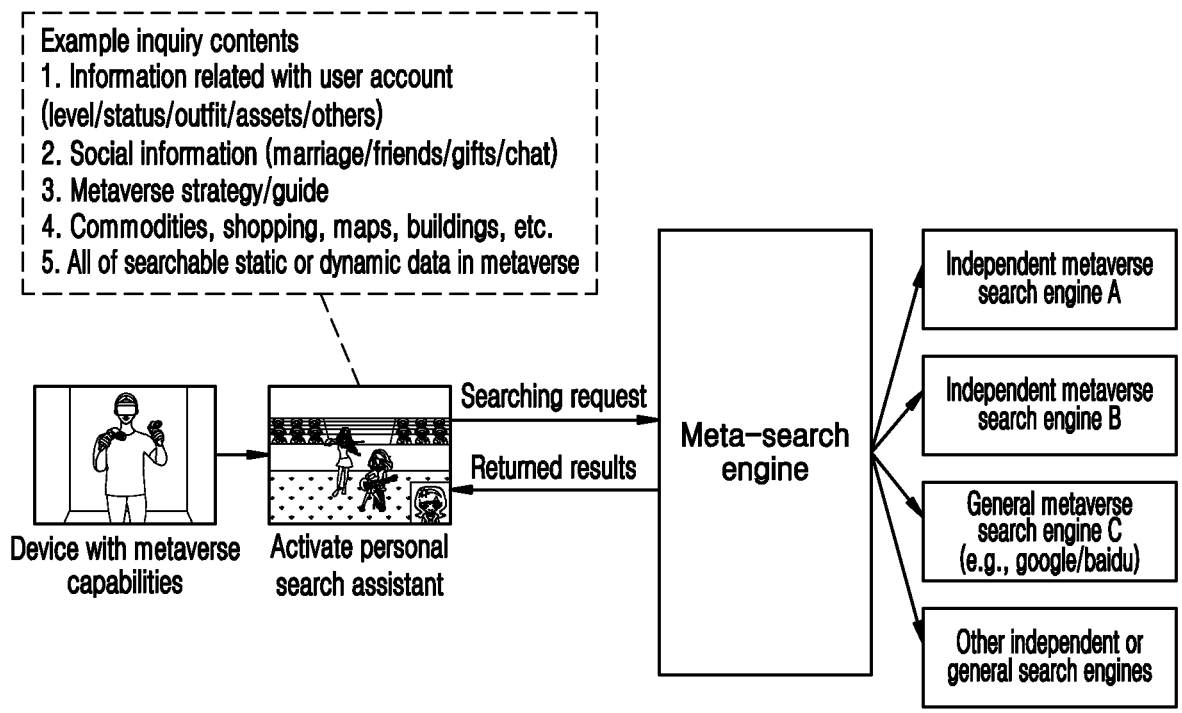
FIGS. 6 and 7 are schematic diagrams illustrating exemplary application scenarios of an embodiment.
Figure 7:
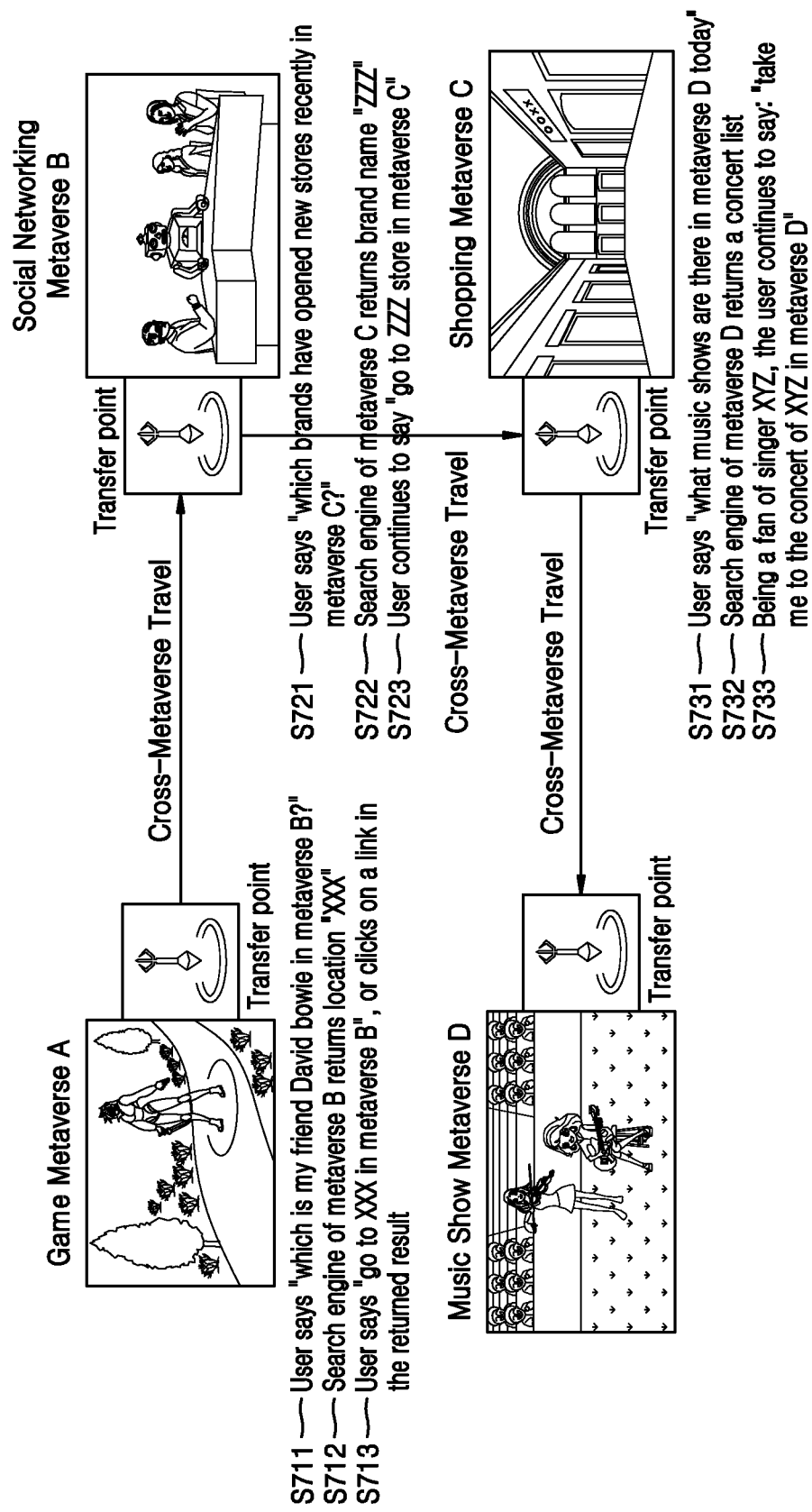

The above method embodiments may be applied to a variety of application scenarios, which are exemplified below with reference to FIGS. 6-7.

A first application scenario may relate to a search of the deep contents in a metaverse. As shown in FIG. 6, the deep contents may include all of searchable contents within the metaverse, including, but not limited to, basic information related with a user account, social information, metaverse guides, commodity information, maps, buildings and other data, etc.

A first application scenario may relate to association of searching with other functions of the metaverse. For example, after obtaining location information from a search, a travel function within a game is invoked to implement a travel to a specified location in another metaverse, for example realizing a time travel from one metaverse to another metaverse. FIG. 7 illustrates example of associating searching with another function of the metaverse. As shown in FIG. 7, this example may include a process 700.

First, user may be in metaverse A.

At step S711, the user speaks "where is my friend David bowie in metaverse B?".

At step S712, a search engine of metaverse B returns a location "XXX".

At step S713, user speaks "go to XXX in metaverse B", or clicks on a link in the returned result.

Next, the user travels to metaverse B.

At step S721, the user speaks "which brands have opened new stores recently in metaverse C".

At step S722, search engine of metaverse C returns a brand name "ZZZ".

At step S723, the user continues to speak "go to the ZZZ store in metaverse C".

Next, the user travels to metaverse C.

At step S731, the user speaks "what music shows are there in metaverse D today".

At step S732, a search engine of metaverse D returns a concert list.

At step S733, being a fan of singer XYZ, the user continues to speak: "take me to the concert of XYZ in metaverse D".

Next, the user travels to metaverse D.

Figure 8:
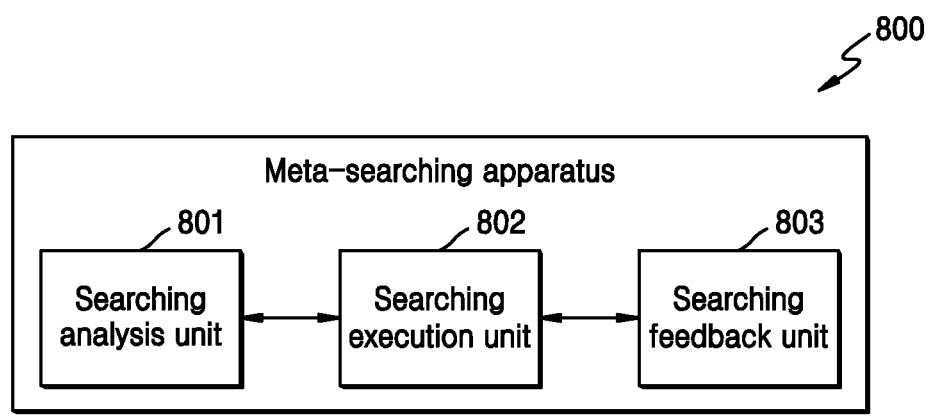
FIG. 8 is a schematic diagram illustrating the structure of an apparatus according to an embodiment.

Embodiments may also provide a meta-searching apparatus. As shown in FIG. 8, the apparatus may include:

- a searching analysis unit 801, configured to determine a target metaverse of a current search using an intent classification method based on an inquiry text in a searching request of a user, and extract a searching clue and a clue type of the searching clue;
- a searching execution unit 802, configured to determine a search engine for performing the current search using the target metaverse and the clue type based on a principle of prioritizing the usage of the search engine of the target metaverse, and perform a search using the search engine and the searching clue; when it is determined to use the search engine of the target metaverse, if user account information is required for inquiring about the searching clue, perform identity authentication based on the user account information of the user in the target metaverse prior to the search, and perform the search only after the identity authentication is passed; and
- a searching feedback unit 803, configured to feed search results back to the user.

It should be noted that the apparatus embodiments corresponding to FIG. 8 may correspond to the method embodiments discussed above with respect to FIGS. 1-7. Because the method and the apparatus adopt similar principles for problem-solving, the implementation of the apparatus and the method may be referred to each other, and redundant or duplicative description is not repeated herein.

Embodiments of the present application implement a computer program product including computer programs/instructions which, when executed by a processor, implement the steps of the meta-searching method as described above.

It should be noted that some of the steps and modules in the above flowcharts and structural diagrams may be omitted according to actual requirements. The order of execution of the various steps is not fixed and may be adjusted as required. The various modules are merely for facilitating the description of the functional modules adopted. In actual implementation, one module may be implemented by multiple modules. The functions of multiple modules may also be realized by one module. These modules may be located in the same device or in different devices.

Hardware modules in the various implementations may be implemented mechanically or electronically. For example, a hardware module may include a specially designed permanent circuit or logic device (e.g. a dedicated processor such as an FPGA or an ASIC) to perform a particular operation. The hardware module may also include a programmable logic device or circuit (e.g. including a general purpose processor or other programmable processors) temporarily configured by software to perform a particular operation. The implementation of the hardware modules mechanically, or using a dedicated permanent circuit, or using a temporarily configured circuit (e.g. configured by software) may be determined based on cost and time considerations.

Figure 9:
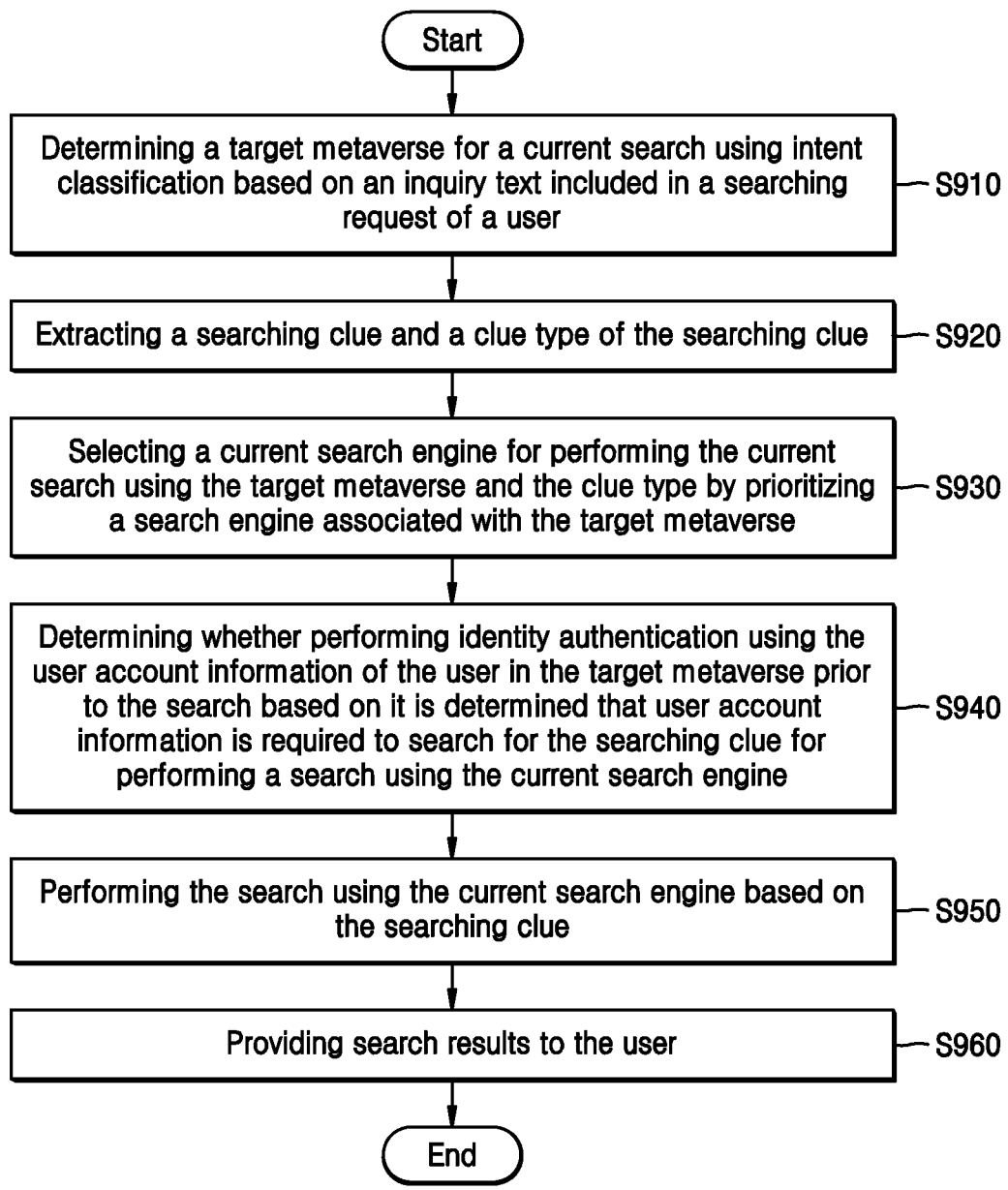
FIG. 9 is a flowchart illustrating a method of an embodiment.

FIG. 9 is a flowchart illustrating a method of an embodiment.

At step S910, the electronic device may determine a target metaverse for a current search using intent classification based on an inquiry text included in a searching request of a user. The electronic device may perform the step S910 in the same or similar way as the determining of a target metaverse of S101. Detailed descriptions are omitted because it is redundant.

At step S920, the electronic device may extract a searching clue and a clue type of the searching clue. The electronic device may perform the step S920 in the same or similar way as the extracting of a searching clue and a clue type of S101. Detailed descriptions are omitted because it is redundant.

At step S930, the electronic device may select a current search engine for performing the current search using the target metaverse and the clue type by prioritizing a search engine associated with the target metaverse. The electronic device may perform the step S930 in the same or similar way as the extracting of a searching clue and a clue type of S102. Detailed descriptions are omitted because it is redundant.

At step S940, the electronic device may determine whether performing identity authentication using the user account information of the user in the target metaverse prior to the search based on whether it is determined that user account information is required to search for the searching clue for performing a search using the current search engine. In an embodiment, depending on the setting of the metaverse, identity authentication may or may not be required. When it is identified of determined that identity authentication using the user account information for the target metaverse is required, the electronic device may perform user authentication using user account information. But, when it is determined that performing identity authentication is not required, a search is performed without identity authentication.

At step S950, the electronic device may perform the search using the current engine based on the searching clue. The electronic device may perform the step S950 in the same or similar way as the performing of the search of S102. Detailed descriptions are omitted because it is redundant.

At step S960, the electronic device may provide the search results. The electronic device may perform the step S960 in the same or similar way as the providing the search results of S103. Detailed descriptions are omitted because it is redundant.

Figure 10:
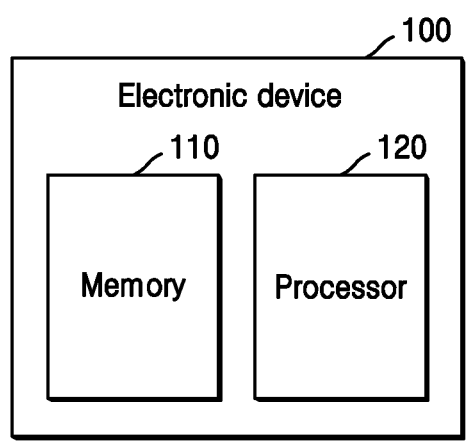
FIG. 10 is a block diagram illustrating an electronic device of an embodiment.

FIG. 10 is a block diagram illustrating an electronic device of an embodiment.

In an embodiment, the electronic device (100) for the meta-searching is include a memory (110) and at least one processor (120). The memory (110) stores an application program executable by the processor to cause the processor to perform the meta-searching method described above. In embodiments, a system or apparatus with a storage medium may be provided. Software program codes capable of implementing the functions of any one of the above embodiments are stored in the storage medium, capable of making a computer (or a central processing unit (CPU) or a microprocessor unit (MPU)) of the system or apparatus read out and execute the program codes stored in the storage medium. Furthermore, some or all of actual operations may be completed by an operating system or the like running in the computer through instructions based on the program codes. The program codes read out from the storage medium may also be written into a memory provided in an extension board inserted into the computer or into a memory provided in an extension unit connected to the computer. Then, an instruction based on the program codes causes a CPU or the like installed on the extension board or the extension unit to perform some or all of the actual operations, to realize the functions of any one of the embodiments of the above meta-searching method.

In an embodiment, the memory (110) may be implemented by various storage media such as an electrically erasable programmable read-only memory (EEPROM), a flash memory, and a programmable program read-only memory (PROM). The processor (120) may be implemented to include one or multiple central processing units or one or multiple field programmable gate arrays. The field programmable gate arrays are integrated with one or multiple central processing unit cores. In embodiments, the central processing unit or central processing unit core may be implemented as a CPU or an MCU.

In an embodiment, the at least one processor (120) may be operable to perform the above examples. Also, the at least one processor (120) may perform operation performed by at least one of the searching analysis unit (801), the searching execution unit (802), and the searching feedback unit (803). Detailed descriptions are omitted because it is redundant.

As used herein, "schematic" means "serving as an instance, example, or illustration". Any illustration and implementation described herein as "schematic" should not be construed as a more preferred or advantageous technical mechanism. For simplicity of the drawings, only some portions are schematically depicted in the figures and are not representative of an actual structure of a product. In addition, for simplicity and ease of understanding, only one of components having the same structure or function is schematically drawn or marked in some figures. As used herein, "one" is not intended to limit embodiments to "only one", and "one" is not intended to exclude embodiments including "more than one". As used herein, "upper", "lower", "front", "back", "left", "right", "inner", "outer", and the like are used merely to indicate relative positional relationships between related portions, and do not limit absolute positions of these related portions.

The above description of embodiments is not intended to limit the protection scope of the disclosure. Any modifications, equivalent replacements, improvements, etc. that come within the spirit and principles of the disclosure are intended to be within the protection scope of the disclosure.

In an embodiment, a meta-searching method is provided. The method may comprise determining a target metaverse for a current search using an intent classification method based on an inquiry text in a searching request of a user, and extracting a searching clue and a clue type of the searching clue. The method may comprise determining a searching engine to perform the current search using the target metaverse and the clue type based on a principle of prioritizing usage of a searching engine of the target metaverse, and performing a search using the searching engine based on the searching clue.

In an embodiment, the method may comprise when it is determined to use the searching engine of the target metaverse, if user account information is required for inquiring about the searching clue, performing identity authentication using the user account information of the user in the target metaverse prior to the search, and performing the search only after the identity authentication is passed. The method may comprise feeding searching results the back to the user.

In an embodiment, the method may comprise determining a searching engine of the target metaverse to serve as the searching engine to perform the current search when the target metaverse includes an independent searching engine which supports the clue type; otherwise, determining a preset general searching engine to serve as the searching engine to perform the current search.

In an embodiment, the method may comprise performing the search using the searching engine based on the searching clue when the searching engine for the current search is a searching engine of the target metaverse. The method may comprise performing the search using the searching engine based on the target metaverse and the searching clue when the searching engine for the current search is a preset general searching engine.

In an embodiment, the method may comprise performing the identity authentication of the user based on the user account information of the user in the target metaverse using a client and/or a server of the target metaverse.

In an embodiment, the method may comprise identifying the user using voice information or a face image of the user and a corresponding biological feature authenticator to obtain a user device name of the user. The method may comprise looking up a preset local metaverse user account configuration table, and determining a metaverse user name and an authentication manner of an account corresponding to the user device name in the target metaverse. The method may comprise performing identity authentication of the user using the client and/or the server of the target metaverse according to the authentication manner based on the user account information stored in a local device.

In an embodiment, the method may comprise sorting the searching results fed back by the searching engine according to a user portrait of the user, and feeding sorted results back to the user, wherein the user portrait comprising searching tendency information of the user.

In an embodiment, a meta-searching apparatus is provided. The apparatus may comprise a searching analysis unit, configured to determine a target metaverse of a current search using an intent classification method based on an inquiry text in a searching request of a user, and extract a searching clue and a clue type of the searching clue. The apparatus may comprise a searching execution unit, configured to determine a searching engine for performing the current search using the target metaverse and the clue type based on a principle of prioritizing usage of a searching engine of the target metaverse, and perform a search using the searching engine and the searching clue, when it is determined to use the searching engine of the target metaverse, if user account information is required for inquiring about the searching clue, perform identity authentication based on the user account information of the user in the target metaverse prior to the search, and perform the search only after the identity authentication is passed. The apparatus may comprise a searching feedback unit, configured to feed searching results back to the user.

In an embodiment, an electronic device is provided. The electronic device may comprise a processor and a memory. The memory storing an application program executable by the processor to perform the meta-searching method.

In an embodiment, a computer-readable storage medium, storing instructions executable by a processor to implement the steps of the meta-searching method.

In an embodiment, a meta-searching method is provided. The method may comprise determining a target metaverse for a current search using intent classification based on an inquiry text included in a searching request of a user (S910). The method may comprise extracting a searching clue and a clue type of the searching clue (S920). The method may comprise selecting a current search engine for performing the current search using the target metaverse and the clue type by prioritizing a search engine associated with the target metaverse (S930). The method may comprise determining whether performing identity authentication using the user account information of the user in the target metaverse prior to the search based on whether it is determined that user account information is required to search for the searching clue for performing a search using the current search engine (S940). The method may comprise performing the search using the current search engine based on the searching clue (S950). The method may comprise providing search results to the user (S960).

In an embodiment, the method may comprise, based on the target metaverse including an independent search engine which supports the clue type, selecting the search engine associated with the target metaverse as the current search engine. The method may comprise, based on the target metaverse not including the independent search engine which supports the clue type, selecting a predetermined general search engine as the current search engine.

In an embodiment, the method may comprise performing the search according to the searching clue based on the current search engine being the search engine associated with the target metaverse. The method may comprise performing the search according to the target metaverse and the searching clue based on the current search engine being a predetermined general search engine.

In an embodiment, the method may comprise performing the identity authentication based on determining that performing the identity authentication using the user account information of the user in the target metaverse.

In an embodiment, the method may comprise performing the identity authentication of the user based on the user account information of the user in the target metaverse using at least one of a client and a server of the target metaverse.

In an embodiment, the method may comprise identifying the user using voice information or a face image of the user and a corresponding biological feature authenticator to obtain a user device name of the user. The method may comprise accessing a predetermined local metaverse user account configuration table, and determining a metaverse user name and an authentication manner of an account corresponding to the user device name in the target metaverse based on the configuration table. The method may comprise performing the identity authentication of the user using the client and/or the server of the target metaverse according to the authentication manner based on the user account information stored in a local device.

In an embodiment, the method may comprise sorting the search results according to a user profile of the user, and providing the sorted search results to the user. The user profile may comprise searching tendency information of the user.

In an embodiment, an electronic device (100) for meta-searching, may comprise a memory (110) configured to store instructions and at least one processor (120) configured to execute the instructions. The at least one processor (120) configured to execute the instructions to determine a target metaverse for a current search using intent classification based on an inquiry text included in a searching request of a user. The at least one processor (120) configured to execute the instructions to extract a searching clue and a clue type of the searching clue. The at least one processor (120) configured to execute the instructions to select a current search engine for performing the current search using the target metaverse and the clue type by prioritizing a search engine associated with the target metaverse. The at least one processor (120) configured to execute the instructions to perform identity authentication using the user account information of the user in the target metaverse prior to the search based on selecting the search engine associated with the target metaverse as the current search engine, and based on it is determined that user account information is required to search for the searching clue. The at least one processor (120) configured to execute the instructions to perform the search using the current search engine based on the searching clue. The at least one processor (120) configured to execute the instructions to provide the search results to the user.

In an embodiment, the at least one processor (120) configured to execute the instructions to, based on the target metaverse including an independent search engine which supports the clue type, select the search engine associated with the target metaverse as the current search engine. The at least one processor (120) configured to execute the instructions to, based on the target metaverse not including the independent search engine which supports the clue type, select a predetermined general search engine as the current search engine.

In an embodiment, the at least one processor (120) configured to execute the instructions to perform the search according to the searching clue based on the current search engine being the search engine associated with the target metaverse. The at least one processor (120) configured to execute the instructions to perform the search according to the target metaverse and the searching clue based on the current search engine being a predetermined general search engine.

In an embodiment, the at least one processor (120) configured to execute the instructions to perform the identity authentication based on determining that performing the identity authentication using the user account information of the user in the target metaverse.

In an embodiment, the at least one processor (120) configured to execute the instructions to perform the identity authentication of the user based on the user account information of the user in the target metaverse using at least one of a client and a server of the target metaverse.

In an embodiment, the at least one processor (120) configured to execute the instructions to identify the user using voice information or a face image of the user and a corresponding biological feature authenticator to obtain a user device name of the user. The at least one processor (120) configured to execute the instructions to access a predetermined local metaverse user account configuration table, and determining a metaverse user name and an authentication manner of an account corresponding to the user device name in the target metaverse based on the configuration table. The at least one processor (120) configured to execute the instructions to perform the identity authentication of the user using the client and/or the server of the target metaverse according to the authentication manner based on the user account information stored in a local device.

In an embodiment, the at least one processor (120) configured to execute the instructions to sort the search results according to a user profile of the user, and providing the sorted search results to the user. The user profile may comprise searching tendency information of the user.

In an embodiment, a computer-readable storage medium, storing instructions for executing the method is provided. In an embodiment, a meta-searching method is provided. The method may comprise determining a target metaverse for a current search using intent classification based on an inquiry text included in a searching request of a user (S910). The method may comprise extracting a searching clue and a clue type of the searching clue (S920). The method may comprise selecting a current search engine for performing the current search using the target metaverse and the clue type by prioritizing a search engine associated with the target metaverse (S930). The method may comprise determining whether performing identity authentication using the user account information of the user in the target metaverse prior to the search based on whether it is determined that user account information is required to search for the searching clue for performing a search using the current search engine (S940). The method may comprise performing the search using the current search engine based on the searching clue (S950). The method may comprise providing search results to the user (S960).

What is claimed is:

1. A cross meta-searching method, comprising:
   receiving a searching request of a user while the user is accessing a current metaverse;
   determining a target metaverse for a current search using intent classification based on an inquiry text included in the searching request of the user, wherein the target metaverse is different from the current metaverse;
   extracting a searching clue and a clue type of the searching clue from a result of the intent classification;
   determining whether the target metaverse includes an independent search engine which supports the clue type, and selecting a current search engine for performing the current search based on a result of the determining;
   determining whether to perform identity authentication for using user account information of the user in the target metaverse prior to the search based on a determination about whether the user account information is required to search for the extracted searching clue for performing a search using the selected current search engine;
   performing the search using the current search engine based on the searching clue; and
   providing search results to the user.

2. The method of claim 1, wherein the selecting of the current search engine to perform the current search comprises:
   based on determining that the target metaverse includes the independent search engine which supports the clue type, selecting a search engine associated with the target metaverse as the current search engine; and
   based on determining that the target metaverse does not include the independent search engine which supports the clue type, selecting a predetermined general search engine as the current search engine.

3. The method of claim 1, wherein the performing of the search using the current search engine comprises:
   performing the search according to the searching clue based on the current search engine being the search engine associated with the target metaverse; and
   performing the search according to the target metaverse and the searching clue based on the current search engine being a predetermined general search engine.

4. The method of claim 1, the further comprising:
   performing the identity authentication based on determining that the user account information is required to search for the searching clue.

5. The method of claim 4, wherein the performing of the identity authentication using the user account information of the user in the target metaverse comprises:
   performing the identity authentication of the user based on the user account information of the user in the target metaverse using at least one of a client and a server of the target metaverse.

6. The method of claim 5, wherein the performing of the identity authentication of the user comprises:
   identifying the user using voice information or a face image of the user and a corresponding biological feature authenticator to obtain a user device name of the user;
   accessing a predetermined local metaverse user account configuration table, and determining a metaverse user name and an authentication manner of an account corresponding to the user device name in the target metaverse based on the configuration table; and
   performing the identity authentication of the user using the client and/or the server of the target metaverse according to the authentication manner based on the user account information stored in a local device.

7. The method of claim 1, wherein the providing of the search results the user comprises sorting the search results according to a user profile of the user, and providing the sorted search results to the user, and
   wherein the user profile comprises searching tendency information of the user.

8. The method of claim 1, further comprising:
   obtaining the searching request of the user;
   extracting the inquiry text from the searching request; and
   determining whether the user account information is required based on the extracted searching clue,
   wherein the searching clue and the clue type of the searching clue are extracted from the inquiry text.

9. An electronic device for cross meta-searching, comprising:
   a memory configured to store instructions; and
   at least one processor configured to execute the instructions to:
      receive a searching request of a user while the user is accessing a current metaverse;
      determine a target metaverse for a current search using intent classification based on an inquiry text included in the searching request of the user, wherein the target metaverse is different from the current metaverse;

extract a searching clue and a clue type of the searching clue from a result of the intent classification;

determine whether the target metaverse includes an independent search engine which supports the clue type, and select a current search engine for performing the current search based on a result of the determining;

determine whether to perform identity authentication for using user account information of the user in the target metaverse prior to the search based on a determination about whether the user account information is required to search for the extracted searching clue;

perform the search using the selected current search engine based on the searching clue; and provide search results to the user.

10. The electronic device of claim 9, wherein the at least one processor is configured to execute the instructions to:

based on determining that the target metaverse includes the independent search engine which supports the clue type, select a search engine associated with the target metaverse as the current search engine; and based on determining that the target metaverse does not include the independent search engine which supports the clue type, select a predetermined general search engine as the current search engine.

11. The electronic device of claim 9, wherein the at least one processor is configured to execute the instructions to:

perform the search according to the searching clue based on the current search engine being the search engine associated with the target metaverse; and perform the search according to the target metaverse and the searching clue based on the current search engine being a predetermined general search engine.

12. The electronic device of claim 9, wherein the at least one processor is further configured to execute the instructions to:

perform the identity authentication based on determining that the user account information is required to search for the searching clue.

13. The electronic device of claim 12, wherein the at least one processor is configured to execute the instructions to:

perform the identity authentication of the user based on the user account information of the user in the target metaverse using at least one of a client and a server of the target metaverse.

14. The electronic device of claim 13, wherein the at least one processor is configured to execute the instructions to:

identify the user using voice information or a face image of the user and a corresponding biological feature authenticator to obtain a user device name of the user;

access a predetermined local metaverse user account configuration table, and determining a metaverse user name and an authentication manner of an account corresponding to the user device name in the target metaverse based on the configuration table; and perform the identity authentication of the user using the client and/or the server of the target metaverse according to the authentication manner based on the user account information stored in a local device.

15. The electronic device of claim 9, wherein the at least one processor is configured to execute the instructions to:

sort the search results according to a user profile of the user, and providing the sorted search results to the user, and wherein the user profile comprises searching tendency information of the user.

16. A non-transitory computer-readable storage medium, storing instructions which, when executed by at least one processor, cause the at least one processor to:

receive a searching request of a user while the user is accessing a current metaverse;

determine a target metaverse for a current search using intent classification based on an inquiry text included in the searching request of the user, wherein the target metaverse is different from the current metaverse;

extract a searching clue and a clue type of the searching clue from a result of the intent classification;

determine whether the target metaverse includes an independent search engine which supports the clue type, and select a current search engine for performing the current search based on a result of the determining;

determine whether to perform identity authentication for using user account information of the user in the target metaverse prior to the search based on a determination about whether the user account information is required to search for the extracted searching clue;

perform the search using the selected current search engine based on the searching clue; and provide search results to the user.

17. The non-transitory computer-readable storage medium of claim 16, wherein the at least one processor is configured to execute the instructions to:

based on determining that the target metaverse includes the independent search engine which supports the clue type, select a search engine associated with the target metaverse as the current search engine; and based on determining that the target metaverse does not include the independent search engine which supports the clue type, select a predetermined general search engine as the current search engine.

18. The non-transitory computer-readable storage medium of claim 16, wherein the at least one processor is configured to execute the instructions to:

perform the search according to the searching clue based on the current search engine being the search engine associated with the target metaverse; and perform the search according to the target metaverse and the searching clue based on the current search engine being a predetermined general search engine.

19. The non-transitory computer-readable storage medium of claim 16, wherein the at least one processor is configured to execute the instructions to:

perform the identity authentication based on determining that the user account information is required to search for the searching clue.

20. The non-transitory computer-readable storage medium of claim 19, wherein the at least one processor is configured to execute the instructions to:

perform the identity authentication of the user based on the user account information of the user in the target metaverse using at least one of a client and a server of the target metaverse.

* * * * *